INVENTOR.
CLARENCE B. RICHEY
BY Tweedale & Gerhardt
ATTORNEYS.

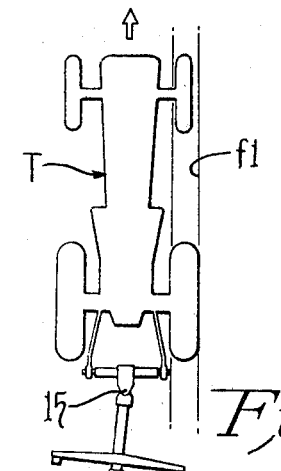
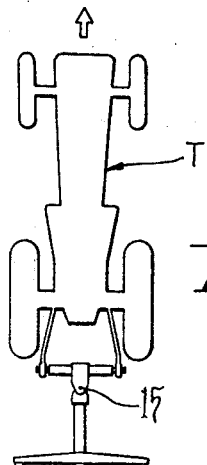
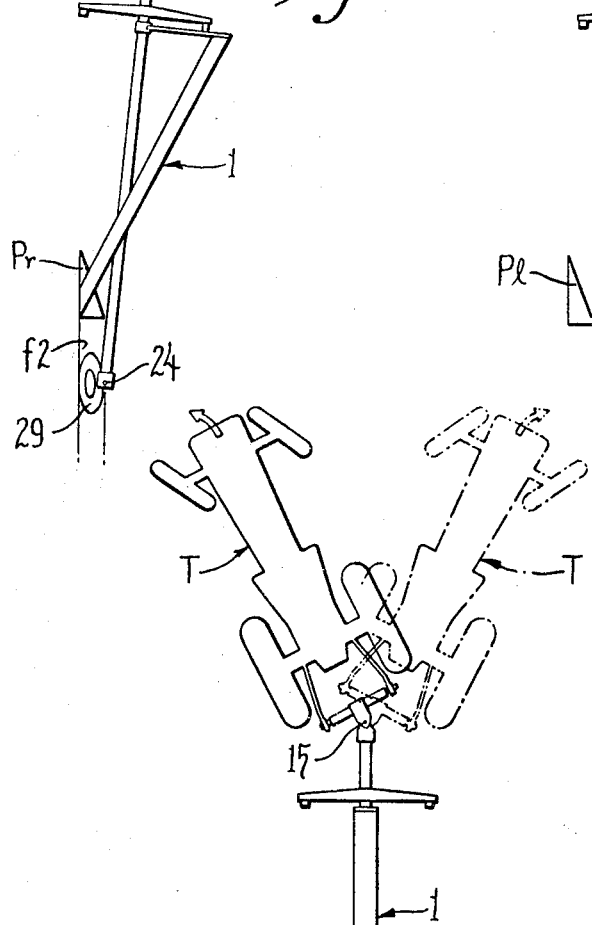
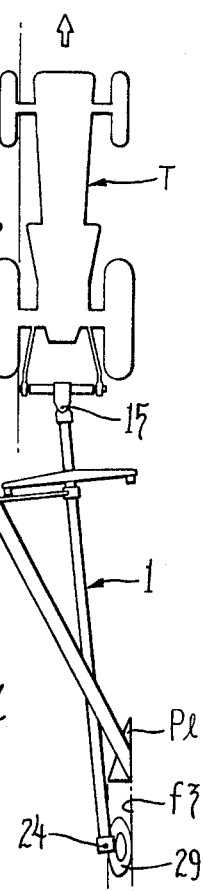
Fig.1 Fig.2 Fig.3 Fig.4
INVENTOR.
CLARENCE B. RICHEY
BY
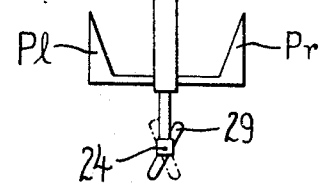
ATTORNEYS.

May 12, 1970 C. B. RICHEY 3,511,317
TURNOVER SEMI-MOUNTED PLOW
Filed April 19, 1967 3 Sheets-Sheet 3

INVENTOR.
CLARENCE B. RICHEY
BY Tweedale & Gerhardt
ATTORNEYS.

United States Patent Office 3,511,317
Patented May 12, 1970

3,511,317
TURNOVER SEMI-MOUNTED PLOW
Clarence B. Richey, Fresno, Calif., assignor to Massey-Ferguson Inc., Detroit, Mich.
Filed Apr. 19, 1967, Ser. No. 632,008
Int. Cl. A01b 3/28, 69/00
U.S. Cl. 172—212                                    1 Claim

ABSTRACT OF THE DISCLOSURE

A semi-mounted, two-way, turnover plow having a ground wheel that is hydraulically steered in accordance with changes in the direction of the tractor, and in which the hydraulic steering system is interconnected with the turnover plow to cause the wheel to steer the trailing end of the plow respectively to the left or right of the tractor longitudinal axis when the left-hand or right-hand plow bottoms are in plowing positions, and to steer the trailing end of the plow in line with the tractor longitudinal axis when the plows are in transport position.

SUMMARY OF THE INVENTION

My copending U.S. application Ser. No. 524,191, filed Feb. 1, 1966, the entire disclosure of which is incorporated herein by reference, discloses a semi-mounted, turnover plow having a plow frame rotatably mounted on an elongated draft frame member, the trailing end of the draft frame member being supported on a steerable ground wheel. The forward end of the draft frame member is supported for side to side swinging movement on the tractor hitch. The ground wheel is interconnected with the forward connecting means such that changes in direction of the tractor cause corresponding turning movement of the ground wheel to steer the trailing end of the plow in accordance with changes in the direction of the tractor. Moreover, when the plows are in their working positions, the soil forces on the plows include side forces tending to swing the plow to the left or to the right of the tractor longitudinal axis depending upon whether the left- or right-hand plow bottoms are in their earthworking position. The ground wheel is interconnected with the plow frame such that rotation of the plow frame to one or the other of its plowing positions causes the ground wheel to turn relative to the draft frame member in a direction to steer the trailing end of the draft frame member to one side of the longitudinal axis of the tractor in accordance with the action of the soil forces.

In accordance with the present invention, a hydraulic system is provided for controlling the position of the ground wheel in accordance with the position of the plows and the direction of movement of the tractor. A pair of hydraulic rams are mounted on the draft frame member and are connected by a closed hydraulic system so that extension of one of the rams causes corresponding retraction of the other ram. One of the rams has a piston connected with the tractor hitch and its cylinder pivotally connected with the draft frame member such that the ram is extended and retracted in accordance with changes in the angular position of the draft frame member with respect to the tractor longitudinal axis. The other ram has a piston connected with a spindle for the ground wheel and its cylinder pivotally connected with a bell crank lever that moves about its fulcrum upon rotation of the plow frame relative to the draft frame member.

BRIEF DESCRIPTION OF THE DRAWINGS

FIGS. 1–4 are schematic plan views of the tractor and an implement according to the invention illustrating various modes of operation of the implement.

DETAILED DESCRIPTION OF THE PREFERRED EMBODIMENT

Figure 5:
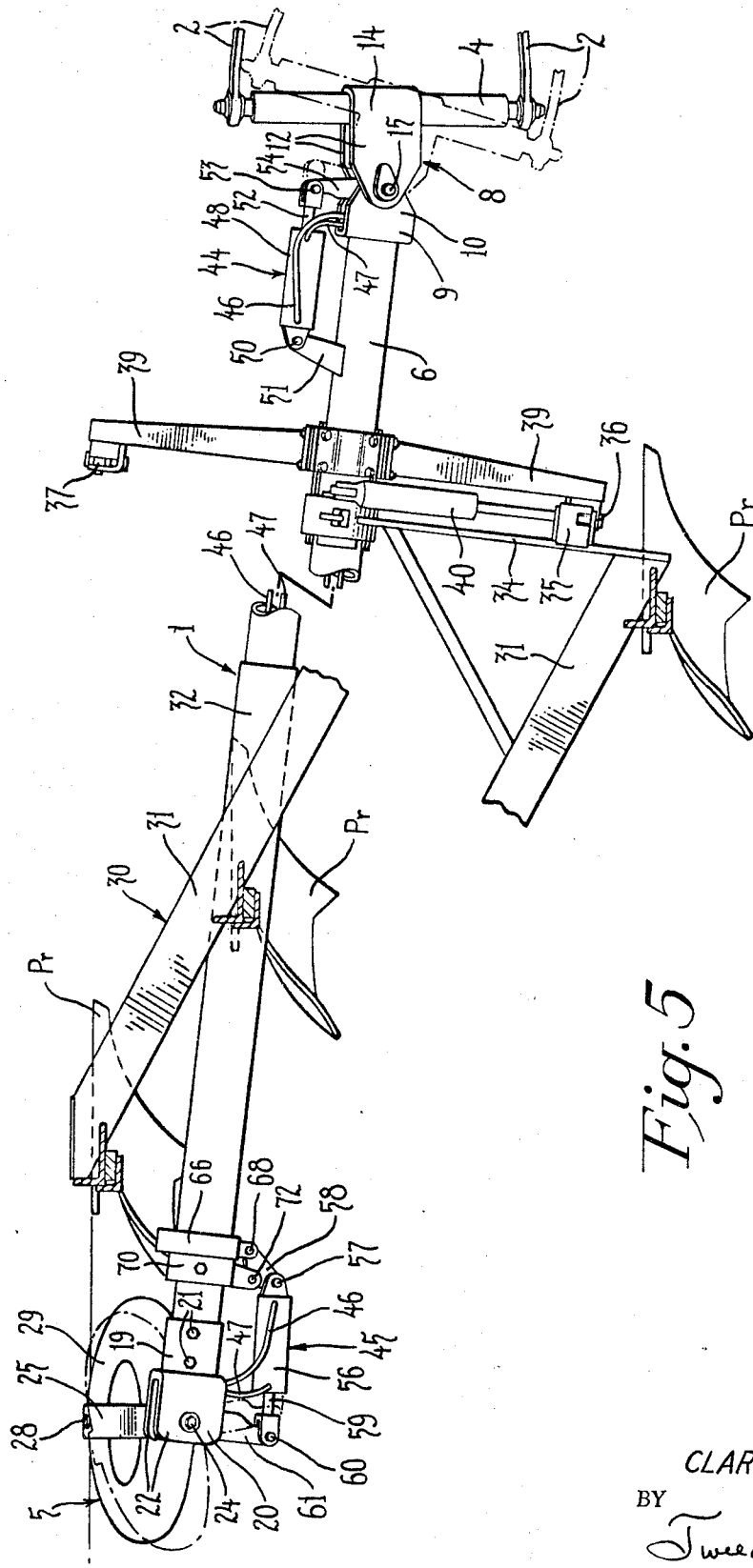
FIG. 5 is a plan view of an implement embodying the invention in its preferred form.

FIGS. 1–4 schematically illustrate a multiple bottom turnover plow 1 drawn by a tractor T. For simplicity of illustration, only the trailing right-hand plow bottom P$r$ and left-hand plow bottom P$l$ are shown, it being understood that the plow 1 will normally carry multiple sets of oppositely projecting left- and right-hand plow bottoms. In FIG. 1, the plow is in its right-hand plowing position with the plow bottoms P$r$ in working position and the plow bottoms P$l$ in an inoperative position out of engagement with the ground. The right wheels of the tractor T ride in a furrow $f1$ opened by the trailing plow bottom P$l$ on the previous pass of the tractor in the opposite direction, such that the tractor and implements are tilted toward the right (as viewed from the rear). The tail wheel of the implement is therefore tilted or canted toward the right to provide resistance to transverse forces on the plow. The plow bottom P$r$ moves earth toward the right as the tractor advances in the direction of the arrow of FIG. 1 and opens a furrow $f2$ in the ground. The left wheels of the tractor in FIG. 1 ride on unplowed ground.

In FIG. 4, the plow is in its left-hand plowing position in which the plow bottom P$l$ is in its working position to move earth toward the left, and the left wheels of the tractor are positioned in furrow $f2$, the direction of movement in FIG. 4 being opposite to that in FIG. 1. Thus, in FIG. 4 the tractor and implement 1 are canted to the left as viewed from the rear. Plow bottom P$l$ opens a furrow $f3$, and on the subsequent pass of the tractor in the opposite direction to FIG. 4, the right wheels of the tractor will ride in furrow $f3$. The plow bottoms P$l$ and P$r$ are in their transport positions in FIGS. 2 and 3.

With reference to FIG. 5, the implement is again designated collectively by reference numeral 1 and is connected at its forward end with a cross bar 4 mounted between the trailing ends of the lower draft links 2 of a conventional three-point, hydraulic hitch of the tractor T. The rear end of implement 1 is supported on a wheel or ground support assembly 5.

Implement 1 includes an elongated draft frame member 6 preferably of tubular construction on which is mounted a forward connecting assembly 8 including a C-shaped bracket 9 having vertically spaced arms 10. Arms 10 of bracket 9 are received between the ends of a pair of vertically spaced arms 12 of a frame member 14 mounted on cross bar 4. Arms 10 and 12 are pivotally connected together by a pin or spindle 15 carried by arms 12. Spindle 15 is non-rotatably secured to frame 14 in the manner shown in the above referred to copending application Ser. No. 524,191.

The wheel assembly 5 is mounted on a bracket 20 secured to the end of a sleeve 19 non-rotatably secured to draft frame member 6 by bolts 21. Bracket 20 is formed with vertically spaced rearwardly projecting arms 22. Rotatably mounted on arms 22 is a spindle 24. The shaft 28 of a ground wheel 29 is mounted on an arm 25 having its upper end 27 non-rotatably secured to the lower end of spindle 24. Rotation of spindle 24 in arms 22 of bracket 20 causes wheel 29 to turn about the axis of spindle 24.

The plow bottoms P, only the right-hand plow bottoms Pr being visible in FIG. 5, are supported on a plow frame 30 including a diagonal beam 31 which is secured intermediate its ends to a frame sleeve 32 rotatably mounted on draft frame member 6. The forward end of beam 31 is secured to one end of a transverse frame member 34 which carries a locking member 35. Oppositely projecting arms 38 and 39 carry latching members 36 and 37, respectively, which are alternately engageable by locking member 35. Locking member 35 is actuated by a hydraulic ram 40 which actuates the plow frame to rotate about the axis of draft frame 6 between its alternate left- and right-hand plowing positions and transport position as fully disclosed in the previously mentioned copending application.

Wheel 29 is caused to turn about the axis of spindle 24 by a hydraulic steering system including an expansible and contractible power element in the form of a hydraulic ram 44. A rear hydraulic ram 45 is connected with ram 44 in a closed hydraulic circuit by hydraulic hoses 46 and 47. Ram 44 includes a cylinder 48 pivotally connected by a pin 50 by an arm 51 projecting from draft frame member 6. Reciprocable within cylinder 48 is a piston 52 pivotally connected at 53 with an arm 54 non-rotatably secured to spindle 15. As viewed in FIG. 5, clockwise pivotal movement of draft frame 6 about the axis of spindle 15 causes piston 52 to retract within cylinder 48, and counterclockwise movement of draft frame member 6 about the axis of spindle 15 causes piston 52 to extend from cylinder 48.

Ram 45 includes a cylinder 56 pivotally connected by a pin 57 with a triangular bell crank lever 58. The piston 59 of ram 45 is pivotally connected by a pin 60 with an actuating arm 61 non-rotatably mounted on spindle 24. Consequently, as viewed in FIG. 5, extension of ram 45 causes clockwise movement of wheel 29 about the axis of spindle 24, and conversely, retraction of piston 59 within cylinder 56 causes counterclockwise turning movement of wheel 29 about the axis of spindle 24. Furthermore, extension of piston 59 from cylinder 56 causes hydraulic fluid to be expelled from cylinder 56 through hose 47 to thereby cause piston 52 of ram 44 to retract within cylinder 48. The hydraulic fluid displaced from cylinder 48 flows into cylinder 56 through hose 46.

When the tractor turns toward the left as shown in full lines in FIG. 3 arms, 54 will turn with spindle 15 in a counterclockwise direction to force piston 52 into cylinder 48 expelling hydraulic fluid from cylinder 48 through hose 46 to thereby cause piston 59 to extend from cylinder 56 and turn wheel 29 in a clockwise direction about the axis of spindle 24. Conversely, when the tractor turns to the right as indicated in phantom lines in FIG. 3, arm 54 turns in a clockwise direction to pull piston 52 out of cylinder 48 expelling fluid from cylinder 48 through hose 47 which causes piston 59 to retract within cylinder 56 and turn wheel 29 in a counterclockwise direction about the axis of spindle 24. The trailing end of the plow is thus steered in accordance with the changes in direction of the tractor.

Figure 7:
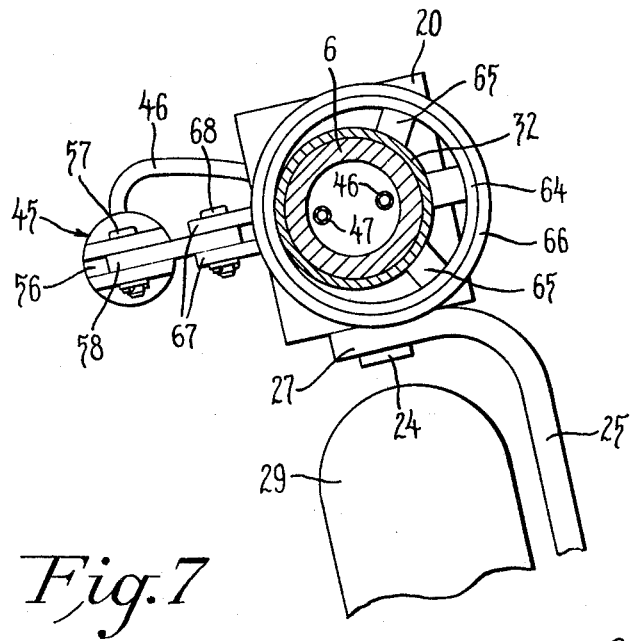
FIG. 7 is a sectional view taken on line 7—7 of FIG. 6.

As pointed out above, the soil forces on the plow when the right-hand plows are in their working position are such that the plow tends to swing toward the left, as shown in FIG. 1, about the axis of spindle 15. Wheel 29 is caused to turn in a counterclockwise direction about the axis of spindle 24 to steer the trailing end of draft frame member 6 to the position shown in FIG. 1 in response to rotation of the plow frame to the right-hand plowing position, or the postions illustrated in FIGS. 1 and 5. With reference to FIG. 7, an eccentric 64 is mounted on the plow frame sleeve 32 by radial spacers 65. Rotatably mounted on eccentric 64 is a collar 66 having a pair of radial lugs 67 to which bell crank lever 58 is connected by a pivot pin 68. A clamp ring 70 is secured to draft frame member 6 against rotation by set screws 71 and is formed with lugs 73 on which bell crank 58 is pivotally mounted by a pivot pin 72.

Figure 6:
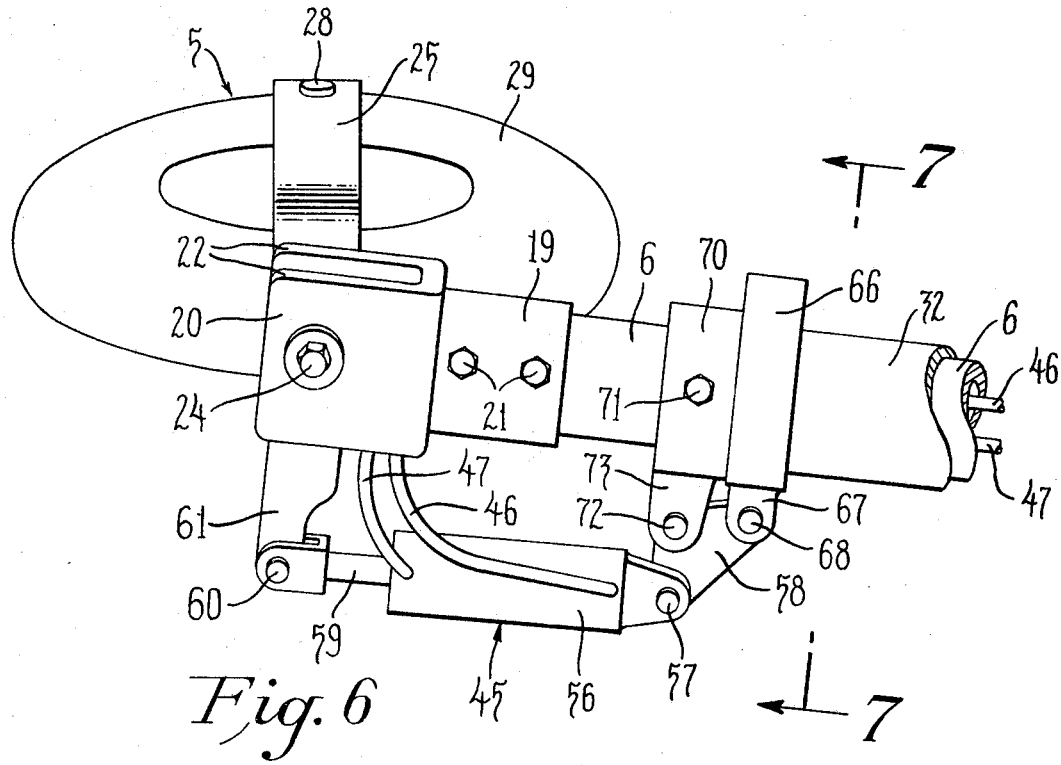
FIG. 6 is an enlarged plan view of the trailing end of the implement of FIG. 5.

As viewed in FIG. 6, movement of pivot pin 68 away from draft frame member 6 causes bell crank 58 to rotate in a clockwise direction about pin 72, which movement is transmitted to arm 61 by ram 45. Thus, if pin 68 is shifted away from draft frame member 6, arm 61 turns wheel 29 in a clockwise direction about spindle 24 as viewed in FIG. 6. Conversely, movement of pin 68 toward the draft frame axis results in counterclockwise turning movement of wheel 29 about spindle 24. As is apparent from FIG. 7, rotation of eccentric 64 180 degrees from the position shown in FIGS. 6 and 7, causes pin 68 to move downwardly to thereby turn wheel 29 clockwise as viewed in FIG. 6. Rotation of eccentric 64 ninety degrees from the position shown in FIG. 7 obviously causes pin 68 to move one-half distance that it would move were the plow frame rotated through an angle of 180 degrees.

When the plow frame is rotated to the right-hand plowing position as shown in FIGS. 1 and 5, wheel 29 is turned relative to draft frame member 6 in a counterclockwise direction to steer the trailing end of the plow frame to the positions shown in FIGS. 1 and 5. When the tractor reaches the end of the field, the plow frame is rotated through an angle of ninety degrees such that both the left-hand and right-hand plows are in transport position as illustrated schematically in FIGS. 2 and 3. This movement is transmitted by eccentric 64 through bell crank 58 and ram 45 to turn wheel 29 to a position in which it is in line with the draft frame member 6 to cause the draft frame to trail along the longitudinal axis of the tractor. When the plow frame is rotated to the left-hand plowing position as illustrated in FIG. 4, the wheel rotates in a clockwise direction relative to draft frame member 6 to steer the trailing end of the plow to the right-hand side of the tractor longitudinal axis. In FIGS. 1 and 4, the implement and tractor are canted toward right and left, respectively, due to the tractor wheels on one side riding in a furrow.

While a specific form of the invention has been illustrated and described in the foregoing specification and drawings, it should be understood that the invention is not limited to the exact construction shown but that various alternatives in the construction and arrangement of parts, all falling within the scope and spirit of the invention, will be apparent to those skilled in the art.

What is claimed is:

1. A multi-bottom turnover plowing implement of the semi-mounted type adapted to be drawn and controlled from a tractor having a power elevated hitch linkage and an auxiliary source of manually controlled power for operation of a remote actuator, comprising in combination a longitudinally extending frame having trunnion means forming a support for an oscillatable plow carrier, means at the forward end of the frame for attaching the implement to a tractor hitch linkage and including a vertical pivot and a transverse pivot, an oscillatable plow carrier mounted on the trunnion means, two arrays of plows of opposite hand fixed to the carrier, an actuator powered and controlled from the tractor and connected between the frame and the carrier to shift the carrier between either of two plowing positions and an intermediate transport position, means including a tail wheel to support the rear end of the frame at a fixed distance above the furrow made by the rearmost plow of either array, and at substantially the same distance above the ground when the carrier is in transport position, means forming a vertical pivot at the rear of the frame about which the tail wheel may oscillate, a first steering mechanism comprising a first hydraulic actuator connected between the tractor and the implement to sense pivotal movement of the tractor relative to the implement about a vertical axis, a second hydraulic actuator connected between the frame and the tail wheel and means interconnecting the first hydraulic actuator to the second hydraulic actuator in such a way that the second hydraulic actuator turns the tail wheel to swing the rear of the implement to the side away from which the tractor is turned and a second steering mechanism connected between the frame and said second hydraulic actuator comprising a shiftable support responsive to oscillations of the plow carrier to shift the second hydraulic actuator and connected to oppose the steering movements of the tail wheel produced by the first steering mechanism as the implement engages the soil and the rear end swings toward the land side under the influence of lateral forces on the working array of plows.

References Cited

UNITED STATES PATENTS

| 2,982,363 | 5/1961 | Sweet et al. | 172—284 |
| 3,428,136 | 2/1969 | Johannsen et al. | 172—285 |
| 2,968,495 | 1/1961 | Hutchens | 280—426 |
| 3,357,501 | 12/1967 | Watts | 172—212 X |

FOREIGN PATENTS 1,051,487  9/1953  France.

ROBERT E. PULFREY, Primary Examiner

S. C. PELLEGRINO, Assistant Examiner

U.S. Cl. X.R.

172—225, 285; 280—443